Dec. 13, 1927.
H. GOLDFIELD
1,652,935
TEACUP
Filed Feb. 24, 1927
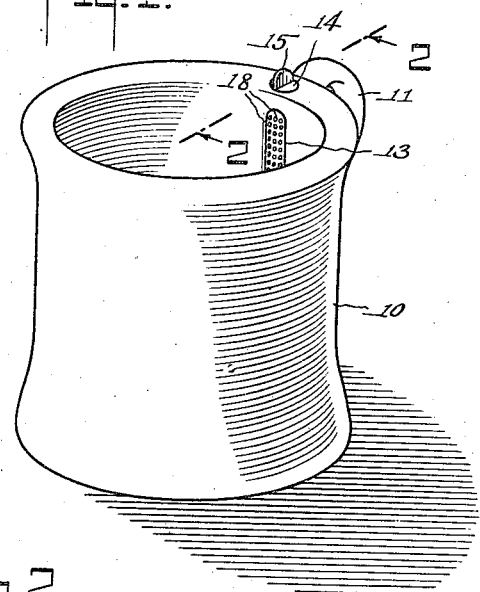
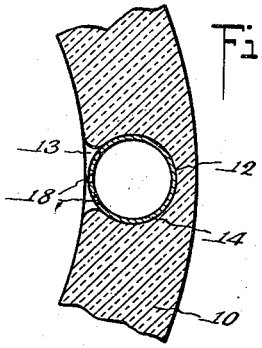
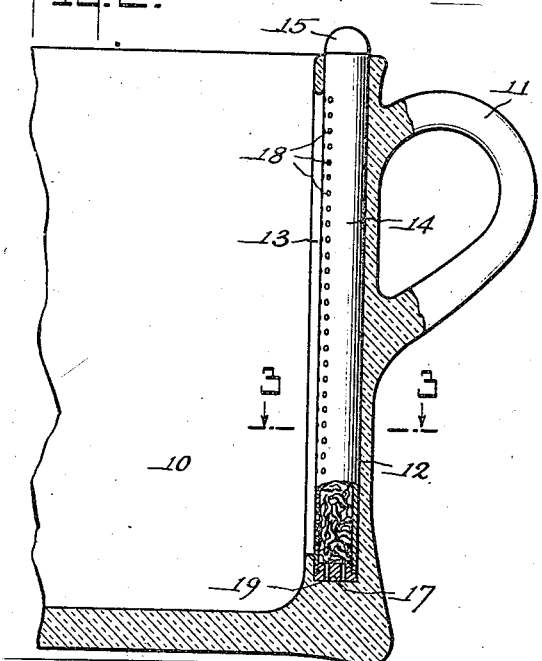
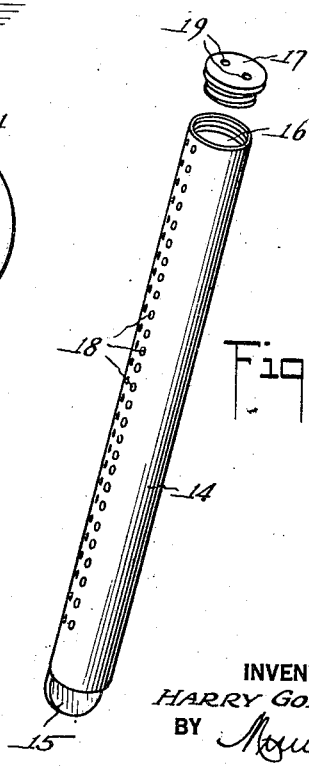
INVENTOR
HARRY GOLDFIELD
BY
ATTORNEY
WITNESSES Patented Dec. 13, 1927.

1,652,935

UNITED STATES PATENT OFFICE.

HARRY GOLDFIELD, OF BROOKLYN, NEW YORK.

TEACUP.

Application filed February 24, 1927. Serial No. 170,595.

This invention relates to a combined drinking and brewing receptacle and has particular reference to a teacup in which boiling water is placed, and which is further provided with a compartment communicating with the interior for the reception of a container in which the tea leaves are placed, the said receptacle being perforated and shiftable in the compartment respectively to positions whereby the same will communicate with the interior of the cup or will be disposed out of communication therewith.

One of the principal objects of the present invention is to provide a combined brewing and drinking receptacle which simplifies the operation of brewing beverages, such as tea, especially as applied to use in restaurants, cafés, and other public eating places.

Other objects reside in the simplicity of construction and mode of use of the invention, the economy with which the same may be produced, and the general efficiency derived therefrom.

With the above and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a perspective view of the combined brewing and drinking receptacle;

Fig. 2 is a vertical sectional view therethrough taken approximately on the line 2—2 of Fig. 1;

Fig. 3 is a fragmentary horizontal sectional view taken approximately on the line 3—3 of Fig. 2;

Fig. 4 is a perspective view of the container element removed from the receptacle.

Referring to the drawings by characters of reference, 10 designates a cup or receptacle which is preferably provided with the usual handle 11 and may be constructed of any suitable material, such as porcelain, china, glass, or the like. The receptacle has one of its walls formed with an opening 12 constituting a compartment, which opening or compartment preferably extends vertically from a point adjacent the bottom through the upper edge. The opening or compartment 12 for a portion of its length, communicates with the interior of the receptacle or body 10 by virtue of a slot 13. The opening or compartment 12 is preferably circular in cross section and is adapted to receive a cylindrical container 14, which is of a diameter to snugly fit the opening or compartment 12. The cylindrical container 14 is provided with a closed upper end having a flat manipulating extension 15 secured thereto, while the lower end 16 is open and is closed by a closure cap 17 which is preferably threadedly engaged in the lower end 16. Along one side the cylindrical container 14 is formed with apertures or perforations 18, while the closure cap is provided with a pair of apertures or openings 19.

In practice, the cup or receptacle is adapted for the brewing of beverages, such as tea, which are subsequently drunk therefrom. The tea leaves or the like are placed in the container 14 when the closure cap 17 is removed from the end 16 and the closure cap is then applied. The container 14 is then inserted in the compartment or opening 12, as illustrated, with the apertures or perforations 18 disposed in alinement with the slot 13. The boiling water or other fluid is placed within the cup body or receptacle 10, allowing sufficient time for the drawing of the tea or brewing of the beverage. When the beverage has reached the desired strength, the user grasps the extension 15 and turns the container 14 so that the perforations or apertures 18 are disposed out of registry with the slot 13. The tea or other beverage is then drunk from the cup or receptacle body 10, after which the container may be removed, emptied, cleansed, and refilled. Similarly the cup or receptacle 10 may be cleansed and sterilized for the reception of the container to repeat the brewing and drinking operations.

From the foregoing it will thus be seen that a combined brewing and drinking receptacle has been devised which eliminates the use of tea-balls of cotton or gauze as now served in restaurants, cafés, cafeterias, and other public eating places. It is obvious that the time and trouble incident to this usual method of serving tea or other beverages of this nature, is reduced to a minimum.

What is claimed is:

1. As a new article of manufacture, a combined brewing and drinking receptacle, comprising a receptacle body having a compartment separate from the main receiving compartment and communicating therewith throughout its length, and a container for a beverage producing substance having an apertured portion extending throughout its length, said container removably positioned in said latter compartment and movable respectively to positions for establishing and cutting off communication with the main receiving compartment of the receptacle.

2. A combined brewing and drinking receptacle including a main beverage containing compartment for the reception of a fluid, and a separate compartment for the reception of a substance for the production of the beverage, said compartments having an opening extending substantially throughout the height of said compartments and establishing communication therebetween, and a container removably and shiftably mounted in the latter compartment adapted to contain the beverage producing substance and having an apertured portion extending substantially throughout the length of said container and movable upon shifting of the container respectively into and out of alinement with the communicating opening between the compartments whereby to regulate the strength of the beverage brewed.

3. A combined brewing and drinking receptacle including a main beverage containing compartment for the reception of a fluid, and a separate compartment for the reception of a substance for the production of the beverage, said compartments having an opening establishing communication therebetween, and a container removably and shiftably mounted in the latter compartment adapted to contain the beverage producing substance and having an apertured portion movable upon shifting of the container respectively into and out of alinement with the communicating opening between the compartments whereby to regulate the strength of the beverage brewed, the said container having an open end and a removable closure therefor to facilitate the introduction and removal of the beverage producing substance.

4. A combined brewing and drinking receptacle including a main beverage containing compartment for the reception of a fluid, and a separate compartment for reception of a substance for the production of the beverage, said compartments having an opening establishing communication therebetween, and a container removably and shiftably mounted in the latter compartment adapted to contain the beverage producing substance and having an apertured portion movable upon shifting of the container respectively into and out of alinement with the communicating opening between the compartments whereby to regulate the strength of the beverage brewed, the said container having an open end and a removable closure therefor to facilitate the introduction and removal of the beverage producing substance, the opposite end of said container being closed and formed with a manipulating head projecting from the receptacle body to permit of the removal and shifting of the receptacle in its compartment.

5. A combined brewing and drinking receptacle consisting of a cup having a vertical opening in its wall extending from a point adjacent the bottom through the upper edge, said opening being of circular configuration in cross section, a cylindrical container having a closed upper end provided with a manipulating extension and an open bottom end having a removable closure cap, the said cap having a slot establishing communication between the container opening and the main receiving compartment of the cup, the said container having an apertured portion at one side whereby turning movement of the container in the receiving opening respectively disposes the perforated portion in and out of alinement with the communicating slot.

HARRY GOLDFIELD.